United States Patent
Tenbusch

(10) Patent No.: US 7,406,717 B2
(45) Date of Patent: *Jul. 29, 2008

(54) METHOD FOR OPERATING A CONTROL DEVICE

(75) Inventor: Eberhard Tenbusch, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 569 days.

This patent is subject to a terminal disclaimer.

(21) Appl. No.: 10/477,813

(22) PCT Filed: May 8, 2002

(86) PCT No.: PCT/DE02/01663

§ 371 (c)(1), (2), (4) Date: May 27, 2004

(87) PCT Pub. No.: WO02/093329

PCT Pub. Date: Nov. 21, 2002

(65) Prior Publication Data

US 2004/0199783 A1    Oct. 7, 2004

(30) Foreign Application Priority Data

May 12, 2001 (DE) ................ 101 23 170

(51) Int. Cl.
G06F 9/455 (2006.01)
G06F 12/00 (2006.01)

(52) U.S. Cl. .................... 726/28; 711/103

(58) Field of Classification Search .............. None
See application file for complete search history.

(56) References Cited

U.S. PATENT DOCUMENTS 5,796,179 A * 8/1998 Honaga .................. 307/10.5
5,844,986 A   12/1998 Davis
5,956,408 A    9/1999 Arnold
5,973,411 A * 10/1999 Tado et al. ............. 307/10.5

FOREIGN PATENT DOCUMENTS

| DE | 196 19 354 | 11/1997 |
|---|---|---|
| DE | 196 23 145 | 12/1997 |
| EP | 0 918 275 | 5/1999 |
| EP | 0 997 807 | 5/2000 |

* cited by examiner

*Primary Examiner*—Pramila Parthasarathy
(74) *Attorney, Agent, or Firm*—Kenyon & Kenyon LLP

(57) ABSTRACT

The present invention relates to a method for operating a control unit for controlling or regulating a function of a motor vehicle. The control unit includes a programmable memory device. The control or regulation is realized by executing a computer program (P0) at least partially stored in the memory device and by using data (D0) stored at least partially in the memory device. In order to offer the most efficient protection against manipulation of the contents of the memory device by an unauthorized person, it is provided that, at least following a modification of the computer program (P0) stored in the memory device or of the data (D0) stored in the memory device, the modified computer program (P1) is executed only and/or the modified data (D1) are used only if the modified computer program (P1) and/or the modified data (D1) has/have been successfully verified.

16 Claims, 3 Drawing Sheets

METHOD FOR OPERATING A CONTROL DEVICE

FIELD OF THE INVENTION

The present invention relates to a method for operating a control unit. The control unit is used, e.g., to control or regulate a function of a motor vehicle. The control unit includes a programmable memory device. The control or regulation of the motor vehicle function is realized by executing a computer program that is at least partially stored in the memory device and by using data stored at least partially in the memory device.

BACKGROUND INFORMATION

It is known in the art to use control units to control or regulate an internal combustion engine, a transmission, a steer-by-wire system, an air-conditioning system, etc., of a motor vehicle. On the one hand, the memory device of a control unit must allow the occasional modification of the computer program stored in the memory device and of the data stored therein, so that new program versions or modified limiting values, for example, may be realized for a regulation or control. For this purpose, the memory areas of the memory device in which the computer program and/or the data are/is stored, are deleted and overwritten by a modified computer program and modified data. On the other hand, it must be prevented, however, that unauthorized persons store a manipulated computer program and/or manipulated data in the memory device, since such actions may cause malfunctions of the control unit, which may ultimately result in a defect of the components to be controlled or regulated.

Published German patent document DE 196 19 354 describes a method for safeguarding a programming procedure in such a way that precisely those bytes that are also listed in a programming database may be programmed into the program device. The described method is a simplified hash-total method. In this process, so-called self-control data are written into the memory device of the control unit, concurrently with the computer program and the data. Since it is too time-consuming to include each programmed byte in a hash-total calculation, individual bytes or byte samples are extracted at random, in order to test the correct programming of the memory device on this basis. Such correct programming exists when all self-control data are found in the appropriate memory areas. This known method thus safeguards only the actual programming procedure. It does not protect against the memory device being programmed with a manipulated computer program and/or manipulated data. It also does not protect against the execution of a manipulated computer program and the use of manipulated data. Since the self-control data are part of the computer program or the data stream, unauthorized persons may manipulate the self-control data relatively easily in such a way that, despite a manipulated computer program or despite manipulated data, a correct programming of the memory device is detected and the manipulated computer program is executed using the manipulated data.

Published German patent document DE 196 23 145 describes a method for preventing an inadvertent execution of a delete and/or program routine of a control program for a memory device of a control unit. This is achieved in that, prior to the execution of a delete and/or program routine of the control program, other program components (so-called unlock sequences) must be executed or passwords input. Furthermore, it is ascertained whether an activated testing or programming device is connected before a delete or program routine is executed. Additional protection against unintentional overwriting of a computer program stored in the memory device of a control unit and/or of data stored therein is obtained by storing the executable code of the computer program and/or the data outside of their destination address. For example, it is recommended to store a RAM program outside the RAM, so that the program must be copied into the RAM prior to execution. However, the known method is unable to prevent the execution of an altered computer program stored in the memory element and/or the use of altered data stored therein.

An objective of the present invention is to provide an efficient protection against manipulation of the contents of a memory device of a control unit by unauthorized persons.

SUMMARY OF THE INVENTION

To achieve this objective, it is provided that, at least following a modification of the computer program stored in the memory device or of the data stored in the memory device, the modified computer program is executed, and/or the modified data used only if the modified computer program and/or the modified data have/has been successfully verified.

According to the present invention, it is provided that the new computer program or the new data is/are blocked after a reprogramming of the computer program and/or the data until the verification of the computer program or the data has been successfully completed. Thus, it is not the programming per se that is prevented, but the execution of the program or the use of the data if the result of the verification has indicated that these were manipulated by an unauthorized person. The verification may be implemented before each execution of a modified computer program or before each use of modified data, or it may be carried out at any desired interval (for example, randomly or regularly as a function of the vehicle mileage, the driving hours, the absolute time or of the number of executions of the computer program). A failed verification of the modified computer program or of the modified data may temporarily block an execution of only the modified portion of the computer program or even of the entire computer program, and similarly block a use of only the modified data or else the use of the entire data.

The memory element is designed, for instance, as a non-volatile, rewritable memory device, e.g., a flash EPROM (electronically programmable random access memory). The verification of the modified computer program and/or the modified data is realized in the form of a control program, for instance, which is likewise stored in the memory device. The computer program includes a so-called driving program whose execution fulfills the control or regulating function assigned to the control unit, and a control program that is responsible for the deletion and the programming of the memory areas and for checking the modified programs or data to be stored in the memory areas.

According to an example embodiment of the present invention, it is provided that, within the framework of the modification of the computer program and the data, at least the particular memory area of the memory device in which the computer program and/or the data are/is stored is deleted, and that the modified computer program and/or the modified data is/are subsequently stored in the memory device. A memory area usually includes at least one sector, i.e., 32 kbit. If only individual bytes of a memory area and not the entire memory area is to be modified in a flash EPROM, the entire content of the corresponding memory area may first be copied to an intermediate memory, such as a RAM (random access memory). There the respective bytes are then modified, the memory area deleted, and the entire modified content reprogrammed into the memory area again.

According to an example embodiment of the present invention, it is provided that the at least partial deletion of the memory device and the storing of the altered computer program and/or the altered data in the memory device are initiated by a control program that is also stored in the memory device. The control program receives an instruction for the reprogramming of a particular memory area or a part thereof, from an external programming device located outside the control unit, for example. The control program is then able to delete the corresponding memory area or a part thereof and to reprogram it with the altered computer program or the altered data. After the computer program or the data has/have been changed, the control program verifies the modified content of the respective memory area or a part thereof and allows the execution of the computer program or the use of the data only after a successful verification of the altered contents.

Prior to making changes to a memory area or a part thereof, the control program is copied, as a backup copy (so-called backup), into a memory area outside of the memory area to be deleted or the part thereof that is to be deleted. It is provided that a deletion of a memory area in which the computer program or the data is/are stored is initiated only if the control program has been successfully copied, as a backup, into a memory area outside of the memory area that is to be deleted. The modification of the contents of a memory area or a part thereof is initiated by the backup. Providing the backup ensures that a control program for the modification of the content of the memory area or of a part thereof is assuredly still available even after a computer program or data has/have been altered.

In accordance with the present invention, an altered control program is stored in the memory device as well, together with the modified computer program or the modified data. The altered control program is first checked by the backup. Only then will it initiate the verification of the memory areas in which the modified computer program and/or the modified data is/are stored before a later execution of the modified computer program. Depending on the result of the verification (successful or unsuccessful), an execution of the modified computer program or a use of the modified data will either be possible or impossible.

In the event that the computer program and/or the data is/are to be changed, the backup of the old control program is first generated. The backup deletes the old computer program (including the old control program) and/or the old data. Then the backup programs the new computer program (including the new control program). Only when the new computer program is programmed into the corresponding memory area of the control unit will it likewise be checked by the backup and be declared valid, if appropriate. In a valid new computer program, the new control program is valid as well. A subsequent deletion, programming, checking and a validity declaration of the data area, if appropriate, are then accepted by the valid new control program. Alternatively, it is also possible that the backup is responsible for the deletion, the programming, checking and the validity declaration, if appropriate, both of the computer program area and also of the data area. However, that assumes that the backup is stored in a memory area outside the computer program area and the data area.

If the deletion, programming, checking and, if appropriate, the validity declaration of the computer program area are executed by the backup and the deletion, programming, checking and the validity declaration, if appropriate, of the data area are executed by the checked new control program, it is provided that a deletion of the data area is implemented only if the altered computer program has been verified successfully.

The backup of the control program implements the storing of the modified computer program or the modified data in the memory device. The backup also initiates the verification of the altered computer program and/or the altered data.

According to another example embodiment of the present invention, it is provided that the verification of the modified computer program stored in the originally not yet reprogrammed memory region, or the verification of the modified data stored therein, is implemented by the backup of the control program, which has been stored in the memory device together with the modified computer program and/or the modified data.

The result of the verification is stored in the control unit in a nonvolatile manner. The result is stored in the memory device of the control unit, the backup of the control program implementing the storing of the result. Before the modified program is executed, or before the modified data are used, the backup first checks whether a predefined result of the verification is stored in the control unit.

The result of the verification may be embodied as a test sample or a plurality of test samples stored in predefined locations in those memory areas of the memory device that have been successfully verified. These memory areas are automatically deleted in a reprogramming. The memory areas may be programmed only by the control unit itself, that is, from the inside. A programming from the outside is not possible since the memory areas are not addressable from the outside.

Prior to an execution of the modified program, or prior to the use of the modified data, it is then ascertained whether the correct test samples are stored in the right locations in the memory device. To verify the modified computer program or the modified data, an example embodiment of the present invention provides that the content is checked in the predefined locations of those memory areas in which the modified computer program or the modified data has/have been stored. Since the modified control program is part of the modified computer program, the modified control program is safeguarded via the modified computer program.

To verify the altered computer program or the altered data, a hash-total computation or a signature check may be executed.

Of particular importance is the realization of the method according to the present invention in the form of a memory device for a control unit of a motor vehicle. In this context, a control program that is able to run on a computing element of the control unit, e.g., on a microprocessor, and is suitable for carrying out the method according to the present invention, is stored on the memory device. In this case, the present invention is therefore realized by a control program stored on the memory device, so that this memory device provided with the program constitutes the present invention in the same way as the control method for whose execution the control program is suitable. An electrical memory medium, for example, a read-only memory, a random-access memory, or a flash memory, may be used as memory device.

The present invention also relates to a control program which is suited to implement the method according to the present invention when it runs on the computing device. In this context, the control program is stored on a memory device, e.g., on a flash memory.

As another way of achieving the object of the present invention, means are provided in the control unit so that, at least after a modification of the computer program stored in the memory device or of the data stored in the memory device, a verification of the modified computer program and/or the modified data may be implemented, in order to prevent an execution of the modified computer program and/or the use of the modified data until the modified computer program and/or the modified data has/have been successfully verified. These means may be realized in the form of an expansion for a control program by means of software.

DETAILED DESCRIPTION

Figure 2:
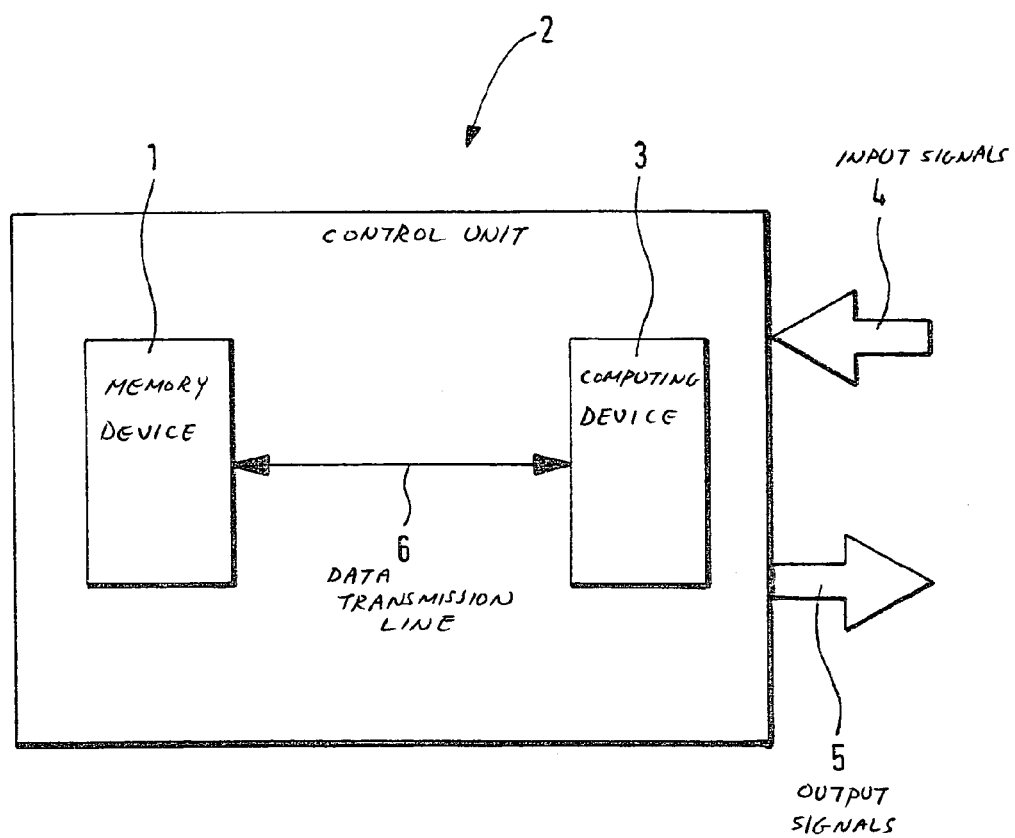
FIG. 2 shows a control unit according to the present invention.

In FIG. 2, a control unit according to the present invention, for controlling and/or regulating functions in a motor vehicle, is designated in its entirety by reference numeral 2. Control unit 2 includes a memory device 1 and a computing device 3, e.g., a microprocessor. Input signals 4 from sensors and sensing elements, which provide control unit 2 with information regarding the state of the motor vehicle or the functions to be controlled or regulated, are present at control unit 2. Control unit 2 generates output signals 5 in order to control actuators for influencing the vehicle functions that are to be controlled or regulated. Using data that are likewise stored on memory device 1, output signals 5 are determined as a function of input signals 4 on the basis of a computer program that is stored in memory device 1 and able to run on computing device 3. A data-transmission line 6 is arranged between memory device 1 and computing device 3. For execution, the computer program is transmitted either in its entirety or according to instruction from memory device 1 to computing device 3, using data transmission line 6. Via line 6, data are also transmitted from memory device 1 to computing device 3 for processing, and newly calculated data are transmitted from computing device 3 to memory device 1 for storing.

Figure 1:
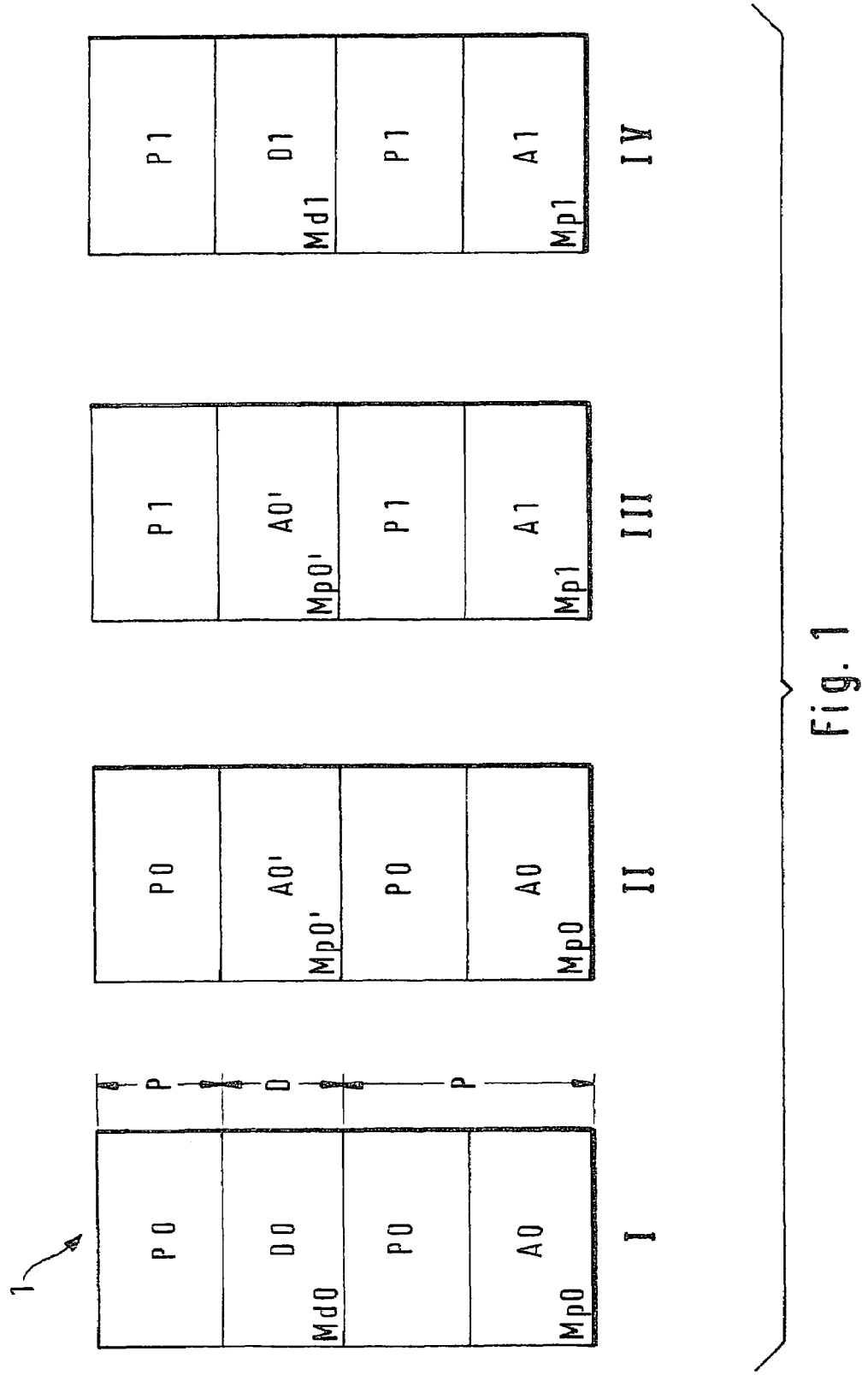
FIG. 1 shows a schematic illustration of a memory device according to the present invention, in four different method steps.
Figure 3:
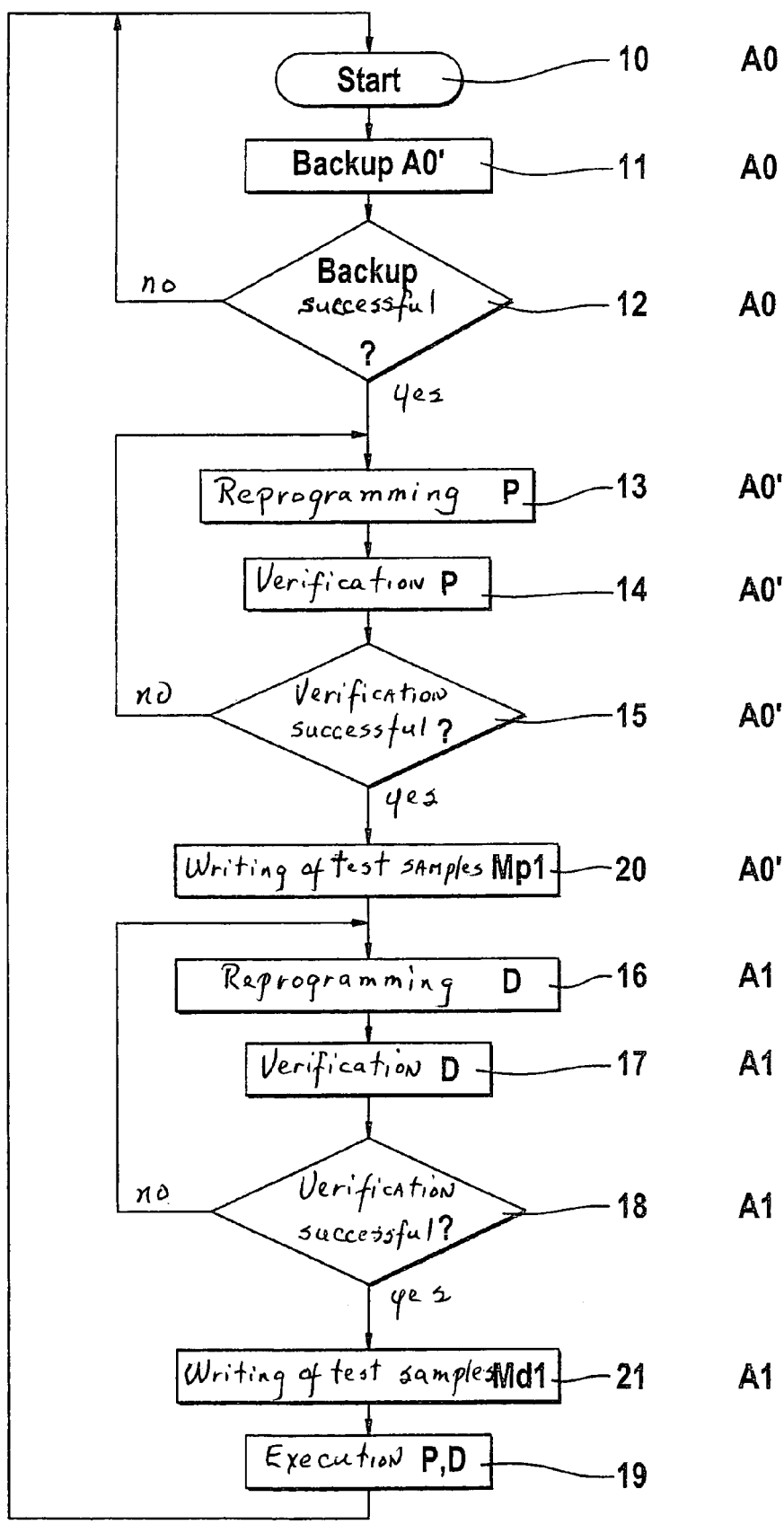
FIG. 3 shows a flow chart of the method according to the present invention.

FIG. 1 shows a schematic illustration of memory device 1 according to the present invention, in four different steps I through IV during execution of a method according to the present invention. A corresponding flow chart of the method of the present invention is illustrated in FIG. 3. To the right of the functional and query blocks in FIG. 3, the designation of the particular control program A0, A0' or A1 initiating the appropriate method steps is indicated.

Memory device 1 includes two memory areas P and D, which are independent of one another. A memory area usually includes at least one sector, e.g., 32 kbit. Memory area P is also referred to as program area and has content P0 at the beginning of the method, P0 standing for a computer program that is stored in memory area P. Memory area D is also known as data area and has content D0 at the beginning of the method, D0 standing for data that are stored in memory area D.

Memory area P also includes a control program A0 with delete and program routines to modify computer program P0 stored in memory device 1 or to modify data D0 stored therein.

Stored in predefined locations in memory areas P and D are test samples Mp0 and Md0, which are used to verify computer program P0 stored in device element 1 or data D0 stored there.

When a new computer program P1 or new data D1 is/are stored in memory device 1, new test samples Mp1 and Md1 are also stored in the corresponding memory areas P and D. Test samples Mp1 and Md1 are ascertained during the programming of memory areas P and D and stored therein. Test samples Mp0, Mp1 and Md0, Md1 are not part of the code to be programmed into memory areas P and D. A write command initiated by a delete and program routine in those locations where test samples Mp0, Mp1 and Md0, Md1 are stored is ignored, so that test samples Mp0, Mp1 and Md0, Md1 cannot be manipulated from the outside.

In the following, the reprogramming of memory device 1 is discussed in greater detail. Memory device 1 shown in step I forms the basis. Memory areas P and D are overwritten in succession by the new contents P1 and D1, via a delete and program routine of the control program. However, it is easily possible to overwrite memory areas P and D individually, without overwriting the other memory area D or P as well.

By applying a corresponding command for reprogramming from the outside with the aid of a testing or programming device, the method shown in FIG. 3 is started in a functional block 10. At the beginning of the reprogramming, a backup A0' of control program A0 is first generated in a functional block 11 and stored in a memory area D that is located outside of memory area P to be reprogrammed (step II). Backup A0' then coordinates the reprogramming of memory area P. A delete command to memory area P is executed only once backup A0' into memory area D has been successfully completed. Whether backup A0' was successful or not is checked in a query block 12.

Following a successful backup, A0' controls the programming of memory area P (functional block 13) with content P1 (step III). The new computer program P1 also includes a new control program A1 with new delete and program routines. Finally, backup A0' of the control program implements a verification of the newly programmed memory area P in a functional block 14.

For verification, a hash-total calculation or a signature check of all previously programmed bytes is implemented, for instance. In a query block 15, it is ascertained whether the verification of memory area P was successful. If this was the case, a test sample Mp1 is stored in a certain location in memory area P in a nonvolatile manner, in a functional block 20. The storing of test sample Mp1 is implemented by backup A0' of the control program. During a reprogramming, the memory areas where test sample Mp1 is stored are automatically deleted. These memory areas may be programmed only by control unit 2 itself, that is, from the inside. An external programming is not possible since the memory areas are not addressable from the outside. Test sample Mp1 is either already known or is ascertained as a function of newly stored computer program P1 including new control program A1.

Before each execution of new computer program P1 or before each use of new data D1, instead of checking the entire memory region P, D it is ascertained only whether the correct test sample Mp1 is stored in the right location in the memory area.

Test sample Mp1 is a validity stamp, which indicates that memory area P1 assigned thereto, including A1, is correct in all programmed bytes. Test sample Mp1 is thus a replacement for a complete hash-total check of all programmed bytes at each power-up of control unit 2, because a complete check of control unit 2 is much more time-consuming than a check of test pattern Mp1 only.

The reprogramming of memory area D is prevented by backup A0' until entire memory area P having content P1, including new control program A1, has been successfully verified.

The reprogramming of memory area D is then implemented by new control program A1, which has been declared valid and correct in the previous step. As soon as memory area P has been verified successfully, memory area D, that is, backup A0' stored therein, is deleted and overwritten by new data D1 (functional block 16). Finally, new control program A1 implements a verification of newly programmed memory area D in a functional block 17, a successful verification of memory area D being checked in a query block 18. If the verification was successful, a test pattern Md1 is stored in a section of memory area D in a functional block 21. Prior to using new data D1, it is not the entire memory area D that is checked for accuracy and validity, but instead it is checked only whether the correct test pattern Md1 has been stored in the right location in memory area D.

The overall configuration, made up of new computer program P1 and new data D1, is able to run only once both the new computer program P1 and new data D1 have been successfully verified. The execution of computer program P1, using data D1, is illustrated in functional block 19. It is then branched back to the beginning of the method again, to functional block 10. An additional verification of memory areas P and/or D may be implemented before each additional execution of new computer program P1, using new data D1, or it may occur at regular or irregular intervals. Test patterns Mp1, Md1 are stored in a nonvolatile manner in memory device 1 of control unit 2, so that this data are available after a new start-up (reset) of control unit 2.

If backup A0' of the control program is not generated successfully at the beginning of the method (query block 12), the deletion is denied, and thus the reprogramming of memory area P as well, so that control program A0 remains active there. If the verification of memory area P fails (query block 15), the deletion and thus the reprogramming of memory area D too, is denied, so that backup A0' of the control program remains active there. However, if memory area P is successfully verified, but the verification of memory area D fails (query block 18), computer program P1 is not executed at all or is not executed using new data D1. Only new control program A1 may be executed for the possible reprogramming of memory area D on the basis of valid data D1. The verification of newly programmed memory areas P and D in functional blocks 14 and 17 may be implemented in the form of a hash-total calculation or a signature check.

What is claimed is:

1. A method of operating a control unit for controlling at least one function of a motor vehicle, the control unit controlling the at least one function by executing a computer program that is at least partially stored in a memory device associated with the control unit and by using data at least partially stored in the memory device, the method comprising:
    verifying whether modification of at least one of the computer program at least partially stored in the memory device and the data at least partially stored in the memory device is authorized; and
    at least one of executing a modified computer program and using a modified data only if the at least one of the modified computer program and the modified data has been verified as being authorized.

2. The method as recited in claim 1, wherein the modification of the at least one of the computer program and the data includes erasing of a first memory area of the memory device where the at least one of the computer program and the data is stored, and storing the at least one of the modified computer program and the modified data in the memory device.

3. The method as recited in claim 2, wherein the erasing of the first memory area of the memory device and the storing of the at least one of the modified computer program and the modified data in the memory device is initiated by a control program stored in the memory device.

4. The method as recited in claim 3, wherein the erasing of the first memory area where the at least one of the computer program and the data is stored is initiated only if the control program has been successfully copied as a backup into a second memory area outside of the first memory area to be erased.

5. The method as recited in claim 4, wherein the storing of the at least one of the modified computer program and the modified data in the memory device is initiated by the copied backup of the control program.

6. The method as recited in claim 4, wherein, in addition to the at least one of the modified computer program and the modified data stored in the memory device, a modified control program is stored in the memory device.

7. The method as recited in claim 6, wherein, following the erasing of the memory device and the storing of the modified computer program in the memory device, erasing of the memory device and storing of the modified data is initiated only if the modified computer program has been verified as being authorized.

8. The method as recited in claim 7, wherein verification of the at least one of the modified computer program and the modified data is initiated by the modified control program.

9. The method as recited in claim 1, further comprising: storing the verification result in the control unit in a nonvolatile manner.

10. The method as recited in claim 9, further comprising:
    storing test samples in memory areas of the memory device that contain the at least one of the modified computer program and the modified data that have been verified as being authorized.

11. The method as recited in claim 10, wherein, to verify the at least one of the modified computer program and the modified data, content of predefined locations of the memory device storing the at least one of the modified computer program and the modified data.

12. The method as recited in claim 1, wherein one of a hash-total calculation and a signature check is used to verify the at least one of the modified computer program and the modified data.

13. A computer-readable medium for storing a control program for a control unit, the control program performing, when executed by a computing device of the control unit, the steps of:
    verifying whether modification of at least one of a first computer program at least partially stored in a memory device and data at least partially stored in the memory device is authorized; and
    at least one of executing a modified computer program and using a modified data only if the at least one of the modified computer program and the modified data has been verified as being authorized.

14. A control program for a control unit, the control program performing, when executed by a computing device of the control unit, the steps of:
    verifying whether modification of at least one of a first computer program at least partially stored in a memory device and data at least partially stored in the memory device is authorized; and at least one of executing a modified computer program and using a modified data only if the at least one of the modified computer program and the modified data has been verified as being authorized.

15. The control program as recited in claim 14, wherein the control program is stored on a flash memory device.

16. A control unit, comprising:

a programmable memory device storing at least a portion of a computer program and data;

a computing device for executing the computer program for performing a desired control using the data; and means for implementing, at least following a modification of at least one of the computer program stored in the memory device and the data stored in the memory device, a verification of the at least one of the modified computer program and the modified data as being authorized, and for preventing at least one of an execution of the modified computer program and a use of the modified data until the at least one of the modified computer program and the modified data have been verified as being authorized.

* * * * *